Figure 1:
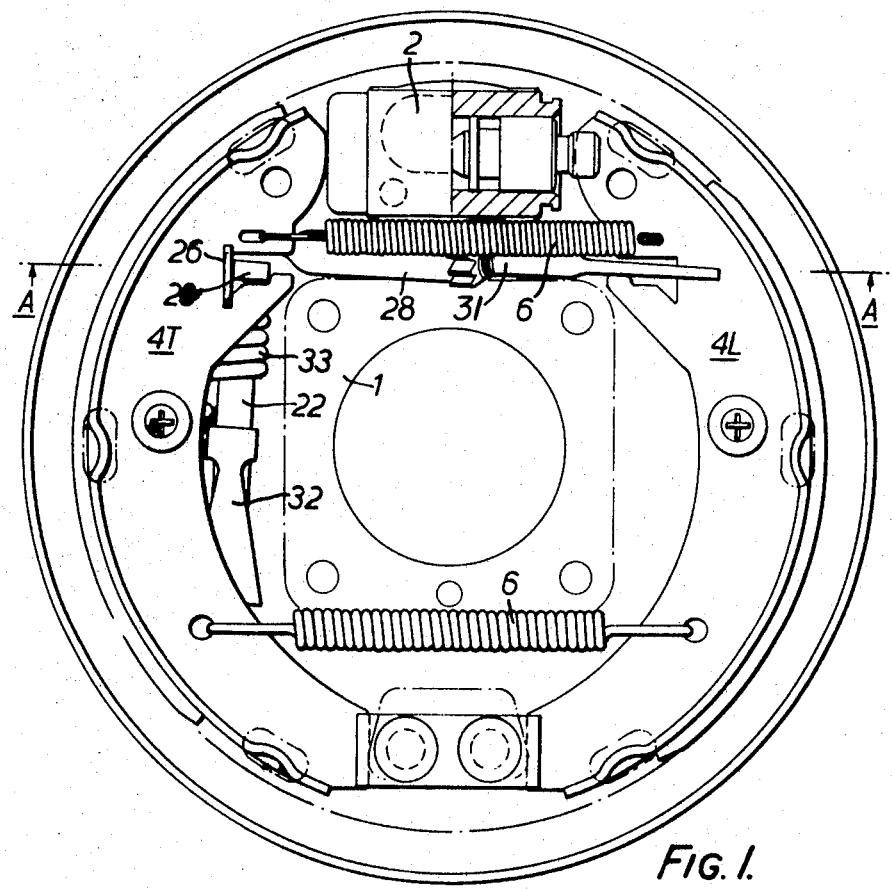

United States Patent

[11] 3,621,947

| [72] | Inventor | Hugh G. Margetts |
| | | Tyseley, Birmingham, England |
| [21] | Appl. No. | 823,616 |
| [22] | Filed | May 12, 1969 |
| [45] | Patented | Nov. 23, 1971 |
| [73] | Assignee | Girling Limited |
| | | Birmingham, England |
| [32] | Priority | May 14, 1968 |
| [33] | | Great Britain |
| [31] | | 22,928/68 |

[54] VEHICLE DRUM BRAKES AND ADJUSTING MEANS THEREFOR
4 Claims, 4 Drawing Figs.

[52] U.S. Cl. .................................................. 188/79.5 P,
188/106 F, 188/196 F
[51] Int. Cl. ........................................................... F16d 65/56
[50] Field of Search............................................ 188/79.5 K,
79.5 SO, 79.5 GC, 79.5 P, 196 R, 196 F, 196 BA

[56] References Cited
UNITED STATES PATENTS
| 1,795,221 | 3/1931 | Latshaw .................... | 188/196 R |
| 2,336,350 | 12/1943 | Fields et al.................. | 188/79.5 P |
| 2,730,205 | 1/1956 | Bauman ...................... | 188/196 F |
| 3,388,776 | 6/1968 | Burnett ........................ | 188/79.5 K |

FOREIGN PATENTS
| 1,159,219 | 12/1963 | Germany...................... | 188/79.5 P |

Primary Examiner—George E. A. Halvosa
Attorney—Scrivener, Parker, Scrivener and Clarke ABSTRACT: The invention relates to an arcuate shoe drum brake which comprises a pair of opposed, arcuate brake shoes, movably mounted on a fixed brake structure, power-actuated service brake means for expanding the shoes against the drum, auxiliary, mechanical actuating means including an actuating lever engaging one shoe and a strut for transmitting auxiliary actuating forces to the other shoe. The strut includes relatively rotatable screw-threaded parts so that the strut is adjustable in length to compensate for wear of the brake shoe linings. A pivoted lever effects relative rotation of the strut parts in response to excessive travel of the brake shoes upon brake application by the auxiliary actuating means. A prestressed coil torsion spring is coupled to the pivoted lever and urges the said lever in a direction in response to operation of the actuating lever the spring being designed to yield to avoid over adjustment when high-braking loads are transmitted to the strut.

VEHICLE DRUM BRAKES AND ADJUSTING MEANS THEREFOR

This invention relates to internal shoe drum brakes for motor vehicles, and is particularly concerned with constructional features of the mechanical actuation and automatic wear compensation in such brakes.

The invention is particularly concerned with internal shoe drum brakes of the general form comprising a pair of opposed, arcuate brake shoes, movable mounted on a fixed brake structure, power-actuated service brake means for expanding the shoes against the drum, auxiliary, mechanical actuating means including an actuating lever engaging one shoe and a strut for transmitting auxiliary actuating forces to the other shoe, the strut including relatively rotatable screw-threaded parts so that the strut is adjustable in length to compensate for wear of the brake shoe linings and a pivoted lever (usually in the form of a pawl arm) for effecting relative rotation of the strut parts in response to excess travel of the brake shoes upon brake application by the auxiliary actuating means.

In brakes of this general form, it is known to arrange for the pivoted lever (or pawl arm) to be driven through the intermediary of a spring, or to constitute a spring in itself, but the type of spring used is usually of a high rate and is initially unstressed.

It will be understood that, with such an arrangement, since the frictional resistance to relative rotation of the screw-threaded members varies with the load imposed on the strut (and in accordance with the degree of any possible corrosion or rusting between them) and the load transmitted by the spring is dictated by this resistance. Accordingly, very close manufacturing tolerances are essential to ensure, firstly, that adjustment is correctly effected when required, secondly that overadjustment is not effected under very high-braking loads and thirdly that the components of the adjuster mechanism are protected against failure from mechanical overloading.

The present invention is directed to overcoming these difficulties and in accordance with the invention, a prestressed coil torsion spring is coupled to the said lever in such a manner as to transmit forces to urge the pivoted lever in a direction to effect wear-compensating adjustment as required in response to operation of the auxiliary actuating means, the said spring being designed to yield to avoid over adjustment under high-braking loads.

The main advantages of a coil torsion spring are that it is readily designed to have a low-spring rate so that it can yield to absorb excessive deflections of the adjuster mechanism, and it also lends itself to precise setting of the preload, either by design of the spring (e.g., by adding or subtracting one or more coils or parts of coils,) or in assembling it when it can be more or less tightly coiled (rotated about its own axis). Such a spring can also be very compact and readily mounted, which is of particular importance where space is at a premium.

The preload in the spring is selected to ensure that throughout the range in which adjustment is required, the spring is stiff enough to transmit the forces required to effect relative rotation of the screw-threaded members. However, when the preload is overcome by the forces transmitted to the spring, the spring yields and thereafter deflects at a low-spring rate to protect the component parts of the adjuster mechanism.

Preferably, the actuating lever and pivoted lever are mounted on a shaft for rotation about the axis thereof, and the torsion spring is mounted about the shaft, thus consuming little additional space.

In the preferred embodiment of the invention the shaft is coupled to the actuating lever for rotation therewith, the pivoted lever is rotatable relative to the shaft and the actuating lever, the said spring serving to transmit rotational forces from the shaft and actuating lever to the pivoted lever up to a maximum value determined by the preload in the spring. Thus, during auxiliary brake operation and adjustment under low-braking loads, the actuating lever, shaft and pivoted lever rotate as a solid unit, but under higher braking loads, the spring yields to accommodate further rotation of the actuating lever and shaft relative to the pivoted lever, to guard against overloading the last said lever, and consequent over adjustment.

Figure 2:
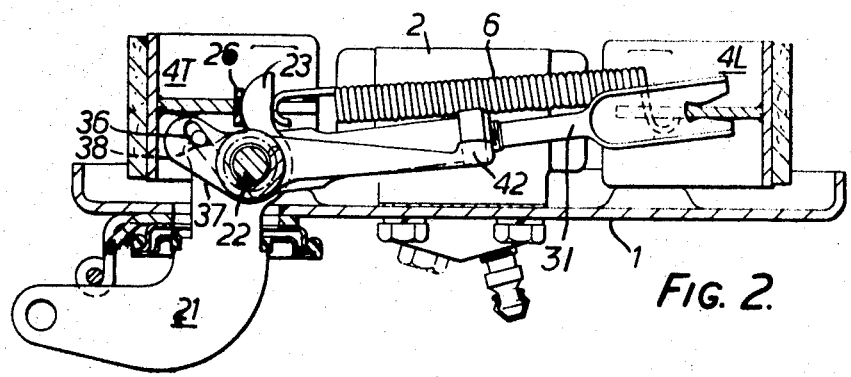
Figure 3:
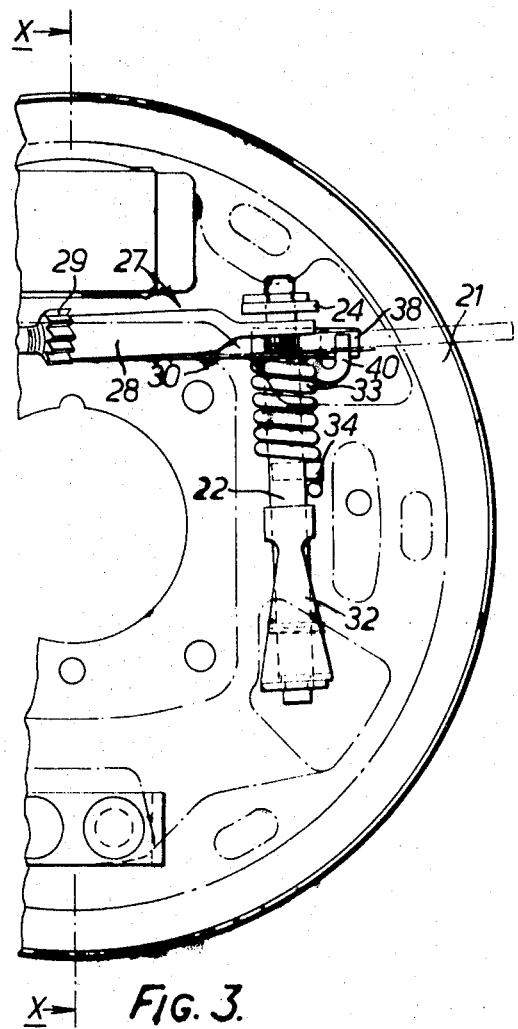
Figure 4:
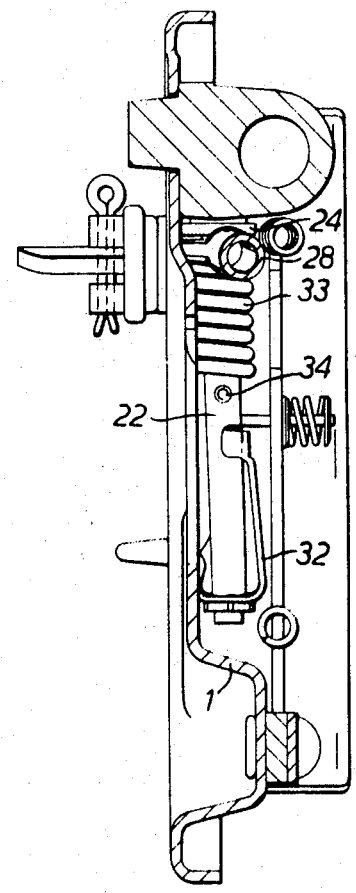

This form of the invention will now be described, by way of example only, with reference to the accompanying drawings, in which:

FIG. 1 is a side elevation of the brake;
FIG. 2 is a section on the line A—A of FIG. 1;
FIG. 3 is a partial elevation from the other side with the brake shoes removed for clarity; and
FIG. 4 is a section on the line X—X of FIG. 3.

The brake shown in the drawings comprises a backplate 1 carrying an hydraulic actuator or slave cylinder 2 engaged by the adjacent tips of a pair of opposed arcuate brake shoes 4T and 4L urged inwardly towards each other by return spring means 6. For service brake operation, the actuator 2 expands the shoes against the action of the return spring means in well-known manner.

The auxiliary (handbrake) actuating mechanism comprises an actuating lever 21, securely mounted on a rotatable shaft 22 and having a finger 23 which engages in a shoe-web window having a wear resistance slipper plate 26. The spindle 22 also extends through an eye at one end of a strut 27 comprising a tubular body portion 28, a nut 29 formed on its outer periphery with ratchet teeth, and a screw-threaded spindle 31 in threaded engagement with the nut 29. The outer end of the spindle 31 is forked and engages in a notch in the adjacent shoe web. The lower end of the shaft 22 is supported in a spring clip 32 which permits articulating movement of the shaft (i.e., rocking movement about a transverse axis), and also spring biases the upper end of the shaft towards the backplate 1. The spring clip extends longitudinally of the shaft and engages an intermediate portion thereof to provide the last-mentioned spring bias. A roller 24 on the shaft engages the backplate to facilitate rocking movement of the shaft about its lower end, in a plane substantially parallel with that of the backplate.

For brake actuation through the above described mechanism, the lever 21 is rotated (by means of a handbrake or other mechanical auxiliary mechanism) in an anticlockwise direction (as seen in FIG. 2) with the shaft 22. The finger 23 presses the shoe 4T to the left, and the reaction is transferred by the shaft 22 to the strut 27 and so to the shoe 4L, to expand the shoes against the action of the return springs 6. The shaft 22 thus acts as a second order lever in transmitting forces from the lever 21 to the strut 27.

The brake is provided with an automatic adjustment device for compensating for wear of the shoe friction linings. This device includes the strut 27 previously described, and operates to increase the effective length of the strut when wear compensating adjustment is required, by rotating the nut 29 in response to excess movement of the shoes upon auxiliary brake actuation. This is effected by means of a pawl 30 forming one arm of a pivoted lever rotatably mounted on the shaft 22. The other arm 37 of the lever has a slot 36 to receive one end 40 of a torsion spring 33 which surrounds the shaft 22 and has its other end anchored to a dowel pin 34 projecting from shaft 22. On assembly the spring is prestressed so as to apply to the pawl lever 30 a force tending to rotate it anticlockwise as view in FIG. 2 so as to urge the pawl tooth 42 into engagement with the ratchet teeth formed on the nut 29.

In the "brakes off" condition, this tendency is resisted by the engagement of the projecting end 40 of spring 33 with a shoulder 38 on actuating lever 21.

However, when the handbrake is actuated, as described above, the lever 21, shaft 22 and pawl 30 rotate together anticlockwise (as seen in FIG. 2). If excess wear requires compensating, this is reflected in sufficient travel of the lever 21 and pawl 30 to pick up a ratchet tooth and rotate the nut 29 in a sense to increase the length of strut 27. At high-braking loads, sufficient to cause deflection of the fixed structure of the brake or expansion of the drum, the force transmitted by the spring 33 is exceeded by the high-frictional resistance to rotation of the nut 29 developed by the braking reaction in strut 27, and the spring yields under continued rotation of shaft 22.

Thus adjustment for excess wear is carried out only in the brake applying stroke during mechanical actuation. Upon service brake actuation, there are no forces tending to rotate the lever 21, which is able to move (with the upper end of shaft 22) parallel with the backplate if the shoe movement is in excess of that required to take up the clearance between the lever finger 23 and the shoe web.

FIG. 3 shows how the spring 33 also acts as a coil compression spring in holding the pawl 30 against the adjacent lower surface of the lever 21 and thus to bias the pawl tooth 42 upwardly against the ratchet teeth of nut 29.

I claim:

1. In an internal shoe drum brake including a drum and brake shoes and having power actuating means and auxiliary mechanical actuating means for applying the shoes to the drum, an automatic wear compensating adjuster comprising first and second relatively rotatable strut parts in screw-threaded engagement with each other and constituting an adjustable strut acting to define a retracted position for said shoes, a pivoted pawl lever rotatable about a pivotal axis transverse to said strut and engageable with one said strut part for effecting rotation thereof, a coil spring prestressed in torsion with its axis aligned with said pivotal axis and having an end directly engaged with said lever to urge the same in a direction for effecting rotation of said strut parts in a wear compensating direction solely under the influence of said spring in response to greater than normal movement of said auxiliary actuating means due to wear of said brake shoes, and means carried by said auxiliary actuating means for preventing said torsion spring from moving said lever in a wear compensating direction when said brakes are released.

2. An internal shoe drum brake comprising a pair of opposed, arcuate brake shoes, movably mounted on a fixed brake structure, power-actuated service brake means for expanding the shoes against the drum, auxiliary, mechanical actuating means including an actuating lever engaging one shoe and a strut for transmitting auxiliary actuating forces to the other shoe, the strut including relatively rotatable screw-threaded parts so that the strut is adjustable in length to compensate for wear of the brake shoe linings, a pivoted lever for effecting relative rotation of the strut parts in response to excessive travel of the brake shoes upon brake application by the auxiliary actuating means, a prestressed coil torsion spring coupled to the said lever to urge the pivoted lever for effecting wear compensating adjustment as required in response to operation of said auxiliary means, said spring being adapted to yield to avoid over adjustment under high-braking loads, and a shaft mounted for rocking movement about a transverse axis, said shaft rotatably supporting said actuating lever and said operating lever, said coil torsion spring being mounted on said shaft to surround the same.

3. A brake according to claim 2, wherein the shaft is coupled to the actuating lever for rotation therewith, the pivoted lever is rotatable relative to the shaft and the actuating lever, the said spring serving to transmit rotational forces from the shaft and actuating lever to the pivoted lever up to a maximum value determined by the preload in the spring.

4. A brake according to claim 2, wherein said torsion spring is also prestressed as a compression spring and acts against said pivoted lever to urge it into operative engagement with said strut.

* * * * *